United States Patent
Ma et al.

(10) Patent No.: US 11,295,621 B2
(45) Date of Patent: Apr. 5, 2022

(54) METHODS AND ASSOCIATED SYSTEMS FOR MANAGING 3D FLIGHT PATHS

(71) Applicant: SZ DJI Technology Co., Ltd., Guangdong (CN)

(72) Inventors: Yuewen Ma, Guangdong (CN); Kaiyong Zhao, Guangdong (CN); Shizhen Zheng, Guangdong (CN); Chihui Pan, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 215 days.

(21) Appl. No.: 16/425,689

(22) Filed: May 29, 2019

(65) Prior Publication Data

US 2019/0318634 A1 Oct. 17, 2019

Related U.S. Application Data

(63) Continuation of application No. PCT/CN2016/108300, filed on Dec. 1, 2016.

(51) Int. Cl.
*G08G 5/00* (2006.01)
*B64C 39/02* (2006.01)
(Continued)

(52) U.S. Cl.
CPC ......... *G08G 5/0034* (2013.01); *B64C 39/024* (2013.01); *G05D 1/0044* (2013.01); *G05D 1/101* (2013.01); *B64C 2201/146* (2013.01)

(58) Field of Classification Search
CPC ................ G08G 5/0034; B64C 39/024; B64C 2201/146; G05D 1/0044; G05D 1/101
See application file for complete search history.

(56) References Cited

U.S. PATENT DOCUMENTS

| 10,191,486 B2* | 1/2019 | Baer .................... G05D 1/0038 |
| 2005/0004723 A1* | 1/2005 | Duggan .................. G06F 17/00 701/24 |

(Continued)

FOREIGN PATENT DOCUMENTS

| CN | 104635579 A | 5/2015 |
| CN | 104702871 A | 6/2015 |

(Continued)

OTHER PUBLICATIONS

PCT International Search Report dated Aug. 29, 2017 for corresponding PCT Application No. PCT/CN2016/108300 (4 Pages).

*Primary Examiner* — Thomas G Black
*Assistant Examiner* — Brittany Renee Peko
(74) *Attorney, Agent, or Firm* — Finnegan, Henderson, Farabow, Garrett & Dunner, LLP

(57) ABSTRACT

Methods and associated systems and apparatus for generating a three-dimensional (3D) flight path for a moveable platform such as an unmanned aerial vehicle (UAV) are disclosed herein. The method includes receiving a set of 3D information associated with a virtual reality environment and receiving a plurality of virtual locations in the virtual reality environment. For individual virtual locations, the system receives a corresponding action item. The system then generates a 3D path based on at least one of the set of 3D information, the plurality of virtual locations, and the plurality of action items. The system then generates a set of images associated with the 3D path and then visually presents the same to an operator via a virtual reality device. The system enables the operator to adjust the 3D path via the virtual reality device.

18 Claims, 7 Drawing Sheets

(51) Int. Cl.
  *G05D 1/00*     (2006.01)
  *G05D 1/10*     (2006.01)

(56) References Cited

U.S. PATENT DOCUMENTS

| | | |
|---|---|---|
| 2009/0087029 A1 | 4/2009 | Coleman et al. |
| 2010/0250022 A1 | 9/2010 | Hines et al. |
| 2010/0292868 A1* | 11/2010 | Rotem .................... G06F 19/00 701/2 |
| 2011/0320068 A1* | 12/2011 | Lee .......................... G05D 1/00 701/2 |
| 2012/0280087 A1 | 11/2012 | Coffman et al. |
| 2015/0016667 A1 | 1/2015 | Algreatly |
| 2015/0341540 A1* | 11/2015 | Kim ................... H04N 5/23203 |
| 2016/0292869 A1 | 10/2016 | Hammond et al. |
| 2016/0307447 A1 | 10/2016 | Johnson et al. |
| 2018/0025649 A1* | 1/2018 | Contreras .............. G08G 5/006 |
| 2018/0157255 A1* | 6/2018 | Halverson ............ G05D 1/0055 |
| 2019/0253611 A1* | 8/2019 | Wang ................. H04N 5/23216 |
| 2019/0253626 A1* | 8/2019 | Li ....................... H04N 5/23238 |

FOREIGN PATENT DOCUMENTS

| | | |
|---|---|---|
| CN | 204669545 U | 9/2015 |
| CN | 105739525 A | 7/2016 |
| CN | 105828062 A | 8/2016 |

\* cited by examiner

METHODS AND ASSOCIATED SYSTEMS FOR MANAGING 3D FLIGHT PATHS

CROSS REFERENCE TO RELATED APPLICATION

The present application is a continuation of International Patent Application No. PCT/CN2016/108300, filed Dec. 1, 2016, which is incorporated herein by reference in its entirety.

TECHNICAL FIELD

The present technology is directed generally to methods and associated systems for generating, analyzing, and verifying a three-dimensional (3D) flight path for a moveable platform such as an unmanned aerial vehicle (UAV).

BACKGROUND

Traditionally, the flight path for a UAV is planned based on certain location points (waypoints) identified on a two-dimensional (2D) map. This approach can be inaccurate because it fails to account for the third dimension (e.g., the height) of the objects, such as buildings, structures, and other obstacles that may exist in the UAV's flight path. This approach also fails to accommodate the need to precisely control the UAV during delicate tasks (e.g., flying the UAV in a modern city with tall buildings to deliver a small item). In addition, it takes a long time and a significant amount of practice for the operator of a UAV to become familiar with the path planning tasks using the traditional approach. The traditional approach does not provide an operator of a UAV with intuitive user experiences when operating the UAV. Therefore, there exists a need for improved methods and systems for generating or planning 3D flight paths for a UAV.

SUMMARY

The following summary is provided for the convenience of the reader and identifies several representative embodiments of the disclosed technology. Generally speaking, the present technology provides improved methods and associated systems that enable an operator to generate, analyze, and verify a 3D flight path of a UAV in a straightforward, easy-to-learn, and intuitive fashion. More particularly, the present technology enables an operator to create and observe a 3D flight path of a UAV via a virtual reality device. For example, the present technology enables an operator to observe and verify a generated 3D flight path from a first-person perspective via a virtual reality device. By doing so, the operator can verify whether the generated 3D flight path is exactly what he/she wants in order to perform a certain task (e.g., filming a movie or taking a picture of a target person or an object). In addition, the present technology enables an operator to generate an accurate 3D flight path and precisely control a UAV to conduct delicate or demanding tasks. Examples of demanding tasks include delivering a package to an east-facing window on a certain floor of a building, collecting an image of the face of an actor standing at a certain location, and filming a moving target from a particular view angle.

Representative embodiments of the present technology include a method and an associated system for generating a 3D path for a UAV. The method includes receiving a set of 3D information (e.g., a set of geographic information, or coordinates of objects) associated with an environment (e.g., a place where a UAV is operated in the real world, such as an area of a city, a defined space in a structure or a building, or an outdoor area) or a virtual reality environment (e.g., generated based on objects in the real world). The method further includes receiving a plurality of virtual locations in the virtual reality environment. In some embodiments, the method can receive physical locations in the real world environment and then transform the same into virtual locations in the virtual reality environment. This can be done by (1) a user input (e.g., a user enters the coordinates of particular locations), (2) a user's selection from a recommended list (e.g., an associated system provides a list of candidate locations from which the user makes a selection), or (3) retrieving data from a storage device (e.g., locations of a path that a UAV traveled previously, locations to which the UAV has frequently flown, and/or locations generated based on log or history files associated with an operator or a UAV). For individual virtual or physical locations, the system receives one or more corresponding action items. Representative action items include performing a pre-determined task at an individual location, such as camera aiming, stabilizing the UAV, collecting an image with a specific size or format, collecting information associated with the individual location (e.g., whether an object/individual can be seen by the UAV at the individual location; collecting/measuring virtual/real ambient information at the individual location), configuring a component of the UAV (e.g., adjusting a power output of a UAV power supply component), etc.

The system then receives a plurality of virtual locations (e.g., locations or coordinates in a virtual reality environment) corresponding to the plurality of locations. In some embodiments, the system can receive physical locations and then generate corresponding virtual locations. Once the virtual locations are determined, the system then generates a 3D path (e.g., a 3D trajectory) based on the set of 3D information. For example, the 3D path can be based on a requirement that it can be kept a certain distance from any object described by the set of 3D information. The 3D path is also based on the plurality of virtual locations (e.g., based on a requirement that the 3D path passes all virtual locations), and the plurality of action items (e.g., the action item can be a UAV flying around a target, and in such case the 3D path includes a path around the target). Details of the virtual reality environment will be discussed in Detailed Description below.

The system then generates a set of images associated with the 3D path based on at least one of the set of 3D information, the plurality of virtual locations, and the plurality of action items. For example, the generated images can be a set of images observed from a first-person perspective from a UAV in the virtual reality environment. The system then visually presents the set of images to an operator. In particular embodiments, the set of images can be presented via a virtual reality device. Accordingly, the system enables an operator to observe a proposed 3D flight path in an intuitive manner.

In particular embodiments, the system enables an operator to adjust the generated 3D path manually or automatically based on a user setting. For example, the operator can create additional locations (e.g., by input via a virtual reality device, a keypad, a touch screen, a control stick, and/or other suitable device) to be included in the 3D path in the virtual environment.

In particular embodiments, the system can include an image component coupled to a UAV configured to collect images based on pre-determined action item. In some embodiments, the image component can include a color-sensing camera that collects color images (e.g., those having red, green, and blue (RGB) pixels). In other embodiments, the image-collection component can be a camera (e.g., a thermal/infrared camera, or a night vison camera) that collects various other types of images.

Some embodiments of the present technology can be implemented as methods for configuring a system for planning flight paths or routes for a UAV. The methods can include programming a computer-readable medium with instructions that, when executed, receive a set of 3D information associated with a virtual reality environment (or a real-world environment, in some embodiments) and receive a plurality of virtual locations in the virtual reality environment (or physical locations in the real-world environment which will be transformed into virtual locations). For individual virtual locations, the instructions can include receiving one or more corresponding action items. The instructions can generate a 3D path based on the set of 3D information, the plurality of virtual locations, and the plurality of action items. The instructions can further generate a set of images associated with the 3D path based on the set of 3D information, the plurality of virtual locations, and the plurality of action items. The instructions can visually present the set of images to an operator. In particular embodiments, images are presented via a virtual reality device. In some embodiments, the instructions can adjust the 3D path in response to receiving an instruction from the operator via a virtual reality device. Methods and systems in accordance with embodiments of the present technology can include any one or a combination of any of the foregoing elements described above.

DETAILED DESCRIPTION

1. Overview

Figure 1A:
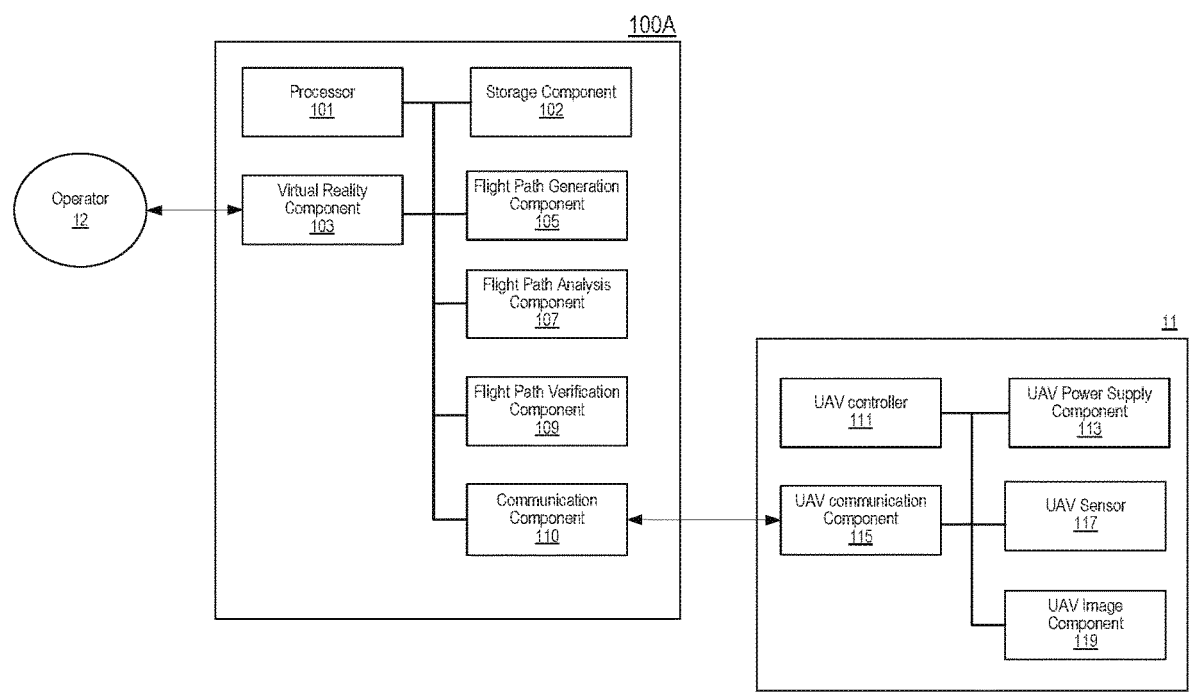
FIG. 1A is a block diagram illustrating a system configured in accordance with representative embodiments of the present technology.

The present technology is directed generally to methods and associated systems for generating, analyzing, and verifying a 3D flight path of a UAV. A representative system configured in accordance with the present technology generates a 3D flight path in a virtual reality environment (e.g., created based on a real-world environment by measuring the dimensions of tangible/physical objects therein and then generating virtual data sets that correspond to the physical/tangible objects) at least partially based on (1) locations that the UAV is to pass, and (2) action items that the UAV is to perform at individual locations. In particular embodiments, the locations can include a real-world location and a virtual reality location. The real-world location can be a set of coordinates corresponding to the real-world environment, and the virtual reality location can be a set of coordinates corresponding to the virtual reality environment. In particular embodiments, the action items can include a task to be performed by the UAV (e.g., rotating to face a different direction) or by a component (e.g., a camera) of the UAV. Representative examples of the action items include (1) aligning an image component of a UAV with a target; (2) positioning an image component of a UAV at a horizontal level; (3) maintaining a view angle of an image component of a UAV; (4) aiming an image component of a UAV toward a target; (5) collecting an image associated with a target via an image component of a UAV; (6) instructing a UAV to fly around a target; and/or (7) instructing a UAV to rotate about an axis.

The system then generates a set of images associated with the 3D flight path. In particular embodiments, the set of images includes virtual reality images that the UAV would collect (according to the locations and corresponding action items) when it flies along the 3D flight path in the virtual reality environment. The flight path or portions of the flight path can be generated a shortest-distance algorithm, or other suitable algorithm, and can account for the expected endurance of the UAV, among other factors. The system then presents the set of images to an operator and provides the operator with an intuitive experience of how environment would look if the UAV were to fly along the generated 3D flight path in a corresponding real-world environment. The system provides the operator an opportunity to review the generated 3D flight path by reviewing of the set of images. In particular embodiments, the operator can adjust the 3D flight path by adding/removing an additional/existing location or action item to the existing 3D flight path via a virtual reality device.

In some embodiments, the system enables the operator to adjust the 3D flight path in a real-time manner. For example, a UAV can take off and fly based on a generated 3D flight path. The real-world images collected by an image component coupled to the UAV can be transmitted to the system and then presented to an operator of the UAV. The operator can then adjust (the not-yet-flown part of) the 3D flight path in the virtual reality environment. Via this arrangement, the system enables the operator to simultaneously monitor and precisely control the UAV to complete delicate, precise, and/or otherwise demanding tasks.

In particular embodiments, the system can generate a 3D flight path at least partially based on one or more rules provided by an operator. For example, these rules can be associated with various factors such as a minimum/maximum distance between a UAV and an obstacle or a target, algorithms for obstacle avoidance (e.g., distance-based, UAV-flight-time based, obstacle based algorithms, etc.), user preferences, and/or other suitable factors.

In some embodiments, an operator can provide the locations or action items to the system via a virtual reality device. In some embodiments, an operator can provide such information by one or more gestures. For example, an operator wearing a virtual reality device on his/her arm can position his/her arm toward a direction in a virtual reality environment, so as to indicate a direction that the operator wants the UAV to face or move toward. As another example, an operator wearing a virtual reality device in front of his/her eyes can blink his/her eyes at a particular location in the virtual reality environment, so as to instruct the system to add this particular location to a 3D flight path. In one example, an operator can input the location information via an input device or a controller. In yet another example, an operator wearing a virtual reality device on his/her hand can use particular hand gestures (e.g., gestures related to a rock-paper-scissors game) to indicate specific action items.

Unlike conventional systems, aspects of the present technology are directed to enabling an operator to generate, analyze, and verify 3D flight paths of a UAV that are suitable for delicate, high-precision and/or other demanding UAV flight tasks. Also, aspects of the present technology can improve the convenience of flight path planning and provide a better and more intuitive user experience than traditional methods. Several details describing structures or processes that are well-known and often associated with UAVs and corresponding systems and subsystems, but that may unnecessarily obscure some significant aspects of the disclosed technology, are not set forth in the following description for purposes of clarity. Moreover, although the following disclosure sets forth several embodiments of different aspects of the technology, several other embodiments can have different configurations or different components than those described in this section. Accordingly, the technology may have other embodiments with additional elements or without several of the elements described below with reference to FIGS. 1-5.

FIGS. 1-5 are provided to illustrate representative embodiments of the disclosed technology. Unless provided for otherwise, the drawings are not intended to limit the scope of the claims in the present application.

Many embodiments of the technology described below may take the form of computer- or controller-executable instructions, including routines executed by a programmable computer or controller. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any suitable data processor and can include Internet appliances and handheld devices (including palm-top computers, wearable computers, cellular or mobile phones, multi-processor systems, processor-based or programmable consumer electronics, network computers, mini computers, a programmed computer chip, and the like). Information handled by these computers and controllers can be presented at any suitable display medium, including a CRT display or an LCD. Instructions for performing computer- or controller-executable tasks can be stored in or on any suitable computer-readable medium, including hardware, firmware or a combination of hardware and firmware. Instructions can be contained in any suitable memory device, including, for example, a flash drive, USB device, or other suitable medium. In particular embodiments, the term "component" can be hardware, firmware, or a set of instructions stored in a computer-readable medium.

2. Representative Embodiments

FIG. 1A is a block diagram illustrating a system 100a configured in accordance with representative embodiments of the present technology. In some embodiments, the system 100a can be or can include an apparatus having a computer-readable media to store information/instructions associated with the components of the system 100a. As shown in FIG. 1A, the system 100a includes a processor 101, a storage component 102, a virtual reality component 103, a flight path generation component 105, a flight path analysis component 107, a flight path verification component 109, and a communication module 110. As shown, the processor 101 is coupled and configured to control the other components of the system 100a. The storage component 102 is configured to, permanently or temporarily, store information generated by the system 100a (e.g., data related to a virtual reality environment and/or generated 3D paths). In particular embodiments, the storage component 102 can include a disk drive, a hard disk, a flash drive, a memory, or the like.

As shown in FIG. 1A, the communication component 110 is configured to transmit/receive signals to/from a UAV 11. A shown in FIG. 1A, the UAV 11 includes a UAV controller 111 configured to control the UAV 11, a UAV power supply 113 configured to provide power to the UAV 11, a UAV communication component 115 configured to communicate with the communication component 110, a UAV sensor 117 configured to measure or detect information associated with the UAV 11, and a UAV image component 119 configured to collect images external to the UAV 11. In particular embodiments, the UAV image component 119 can be a camera that collects two-dimensional images with red, green, and blue (RGB) pixels. The UAV image component 119 can include an image sensor such as a CMOS (complementary metal-oxide semiconductor) image sensor or a CAD (charge-coupled device) image sensor. Examples of the two-dimensional image are described further below with reference to FIGS. 3A, 4A and 4B. The collected images can be transmitted to and stored in the storage component 102. In some embodiments, the UAV image component 119 can be a thermal image camera, night version camera, or any other suitable device that is capable of collecting images.

As illustrated in FIG. 1A, the virtual reality component 103 can serve as an interface between an operator 12 and the system 100a. The virtual reality component 103 is also configured to generate/maintain a virtual reality environment corresponding to a real-world environment. In particular embodiments, the virtual reality component 103 can further include (1) a virtual reality engine configured to generate the virtual reality environment and (2) a virtual reality device/controller configured to interact with a user. For example, the virtual reality engine can be a set of computer-readable instructions or a software application that can (1) process collected location information associated with physical objects in a real-world environment; and (2) accordingly generate a virtual reality environment that contains virtual objects corresponding to the physical objects in the real-world environment. In some embodiments, the virtual reality environment can be generated based on a set of geographical information (e.g., a set of coordinates, lines, or shapes associated with one or more objects in a particular area of the real-world environment). In some embodiments, the virtual reality environment can be generated based on software such as 3ds Max® available from Autodesk Inc. of UK, or other suitable 3D-model-building applications. Embodiments of the virtual reality device include a wearable virtual reality device, tablets, touch screens, displays, etc. In particular embodiments, the wearable virtual reality device can include a headset, a helmet, a goggle, a pair of virtual reality glasses, a glove, a sleeve, a hand-hold device, etc.

The flight path generation component 105 is configured to generate a 3D path at least partially based on one or more (virtual or physical) locations provided by the operator 12 or suggested by the system 100*a*. In some embodiments, the locations can be provided as virtual reality locations in the virtual reality environment (e.g., the operator 12 can identify these virtual locations via the virtual reality component 103). In some embodiments, the locations can be provided as real-world locations (e.g., in a form of real-world coordinates) in the real-world environment. In such embodiments, the provided real-world locations can be transformed into corresponding virtual locations by the virtual reality component 103. For example, the system 100*a* can first determine the relationship between the coordinate systems used in the real-world environment and the virtual reality environment. Once the relationship is determined, the system 100*a* can then transform the provided real-world locations into the corresponding virtual locations (or vice versa, in other embodiments).

The flight path generation component 105 is also configured to generate the 3D path at least partially based on one or more action items corresponding to the provided/suggested locations. In particular embodiments, the action item includes performing a pre-determined task at a particular location. In some embodiments, for example, the action item can involve UAV movements, such as directing a UAV to fly around a target, or instructing a UAV to rotate about an axis. In some embodiments, the action item can involve an action performed by a component of a UAV. In such embodiments, for example, the action item can include: aligning an image component of a UAV with a target; positioning an image component of a UAV at a horizontal level; maintaining a view angle of an image component of a UAV; aiming an image component of a UAV toward a target; collecting an image associated with a target via an image component of a UAV; collecting a set of information by a sensor of a UAV; and/or instructing a communication component of a UAV to transmit a set of information to a remote device (e.g., a smartphone under the control of the operator 12). The information can include UAV information measured by a UAV sensor or images collected by a UAV image component.

When generating a 3D flight path, the flight path generation component 105 also considers the objects, targets, or obstacles in the virtual reality environment. In particular embodiments, the objects, targets, or obstacles in the virtual reality environment can be identified as a set of 3D information (e.g., in formats such as coordinates, lines, shapes, etc.). The flight path generation component 105 can generate a 3D flight path based on one or more pre-determined rules. In some embodiments, these rules can include rules of physics, such as that the 3D flight path cannot pass through a tangible object in the virtual reality environment, or through the ground of the virtual reality environment. In some embodiments, the rules can relate to the maneuverability of a UAV, such as the minimum turn radius of a UAV, the maximum/minimum speed of a UAV, and/or the maximum/minimum acceleration of a UAV.

After a 3D flight path is generated, the flight path analysis component 107 can then analyze the generated 3D flight path and perform a simulation in which a UAV flies along the generated 3D flight path in the virtual reality environment. In particular embodiments, the simulation includes generating a set of virtual reality images that the UAV can collect at each provided locations along the 3D flight path in the virtual reality environment. The flight path analysis component 107 then visually presents the set of images to the operator 12. In particular embodiments, the set of images can be visually presented to the operator 12 via the virtual reality component 103. By doing so, the system 100*a* enables the operator 12 to visually experience the 3D flight path from a first person perspective. By doing so, the operator 12 can have a clear and intuitive sense or understanding of how a UAV would travel in the real world environment. Meanwhile, the operator 12 can review and verify whether a UAV can perform an action item as he/she desires (e.g., filming a target from a particular view angle).

In the illustrated embodiments, the flight path verification component 109 is configured to further verify a generated 3D flight path so as to make sure that the 3D flight path meets certain pre-determined requirements. The requirements can be set by the operator 12 (e.g., based on the operator's preferences or level of skill when operating a UAV, and/or from a third party entity (e.g., a government regulation prohibiting a UAV from flying in a certain area). By verifying the generated 3D flight path, the system 100*a* can provide a safe and practicable 3D flight path to the operator 12.

The system 100*a* can also enable the operator 12 to adjust the generated 3D flight path. In particular embodiments, the operator 12 can add/cancel additional/existing locations to the generated 3D flight path or adjust the curvature of the generated 3D flight path, via the virtual reality component 103. In some embodiments, the operator 12 can adjust the 3D flight path manually (e.g., via a virtual reality device or an input device). In some embodiments, the operator 12 can adjust the 3D flight path in an automatic manner (e.g., based on a user preference that the system has learned from the operator's prior adjustments to generated 3D flight paths during prior tasks/projects). By so doing, the system 100*a* enables the operator 12 to precisely control the UAV 11 to complete desirable tasks.

Figure 1B:
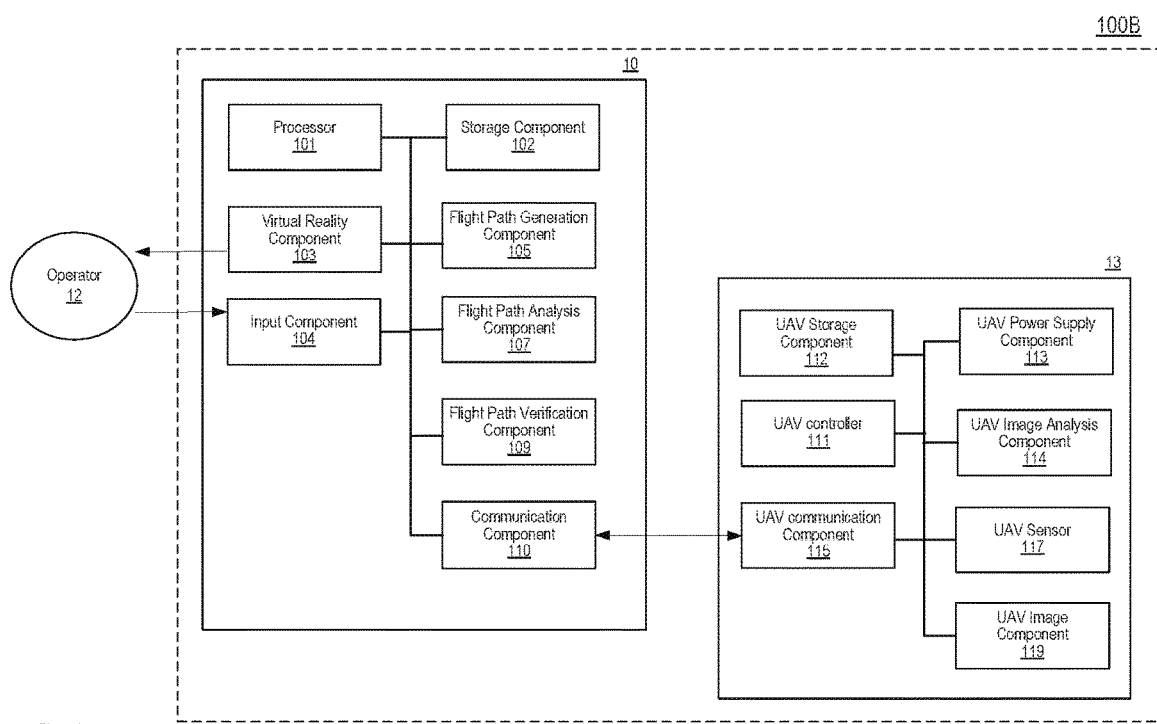
FIG. 1B is a block diagram illustrating a system configured in accordance with representative embodiments of the present technology.

FIG. 1B is a block diagram illustrating a system 100*b* configured in accordance with representative embodiments of the present technology. The system 100*b* includes a 3D flight control system 10 and a UAV 13. As shown in FIG. 1B, compared to the system 100*a* described in FIG. 1, the 3D flight control system 10 includes an additional input component 104 configured to receive a user input from the operator 12. The user input can include: (1) locations or action items to be included in a 3D flight path or (2) one or more rules or requirements to be considered and followed when generating a 3D flight path. In particular embodiments, the additional input component 104 can be a keypad, a touch screen, a control stick, a keyboard, or any other suitable devices.

As shown in FIG. 1B, the UAV 13, as compared to the UAV 11 described in FIG. 1A, further includes a UAV storage component 112 and a UAV image analysis component 114. The UAV image analysis component 114 is configured to compare: (1) the set of images simulated by the flight path analysis component 107 in the virtual reality environment and (2) the images that are actually collect by the UAV component 119 when the UAV 13 flies in the real-world environment. In some embodiments, if the UAV image analysis component 114 identifies a discrepancy between these two sets of images, it will notify the operator 12. In some embodiments, if the UAV image analysis component 114 identifies a discrepancy between these two sets of images, the UAV image analysis component 114 will notify the UAV controller 111, and then the UAV controller 111 will accordingly adjust the UAV 13 (or its components) so as to minimize the discrepancy. For example, a simulated image at location X may include the face of a target person located at the center of the simulated image. When the UAV 13 flies to location X, the UAV image analysis component 114 may find that the images actually collected by the UAV image component 119 do not include the face of the target person (e.g., it may only include the body of that target person). Then the UAV image analysis component 114 can notify the UAV controller 111 to rotate or move the UAV 13 accordingly such that the face of the target person can be shown at the center of the actually collected images. Embodiments of the collected images will be further discussed below with reference to FIGS. 4A and 4B.

Figure 2:
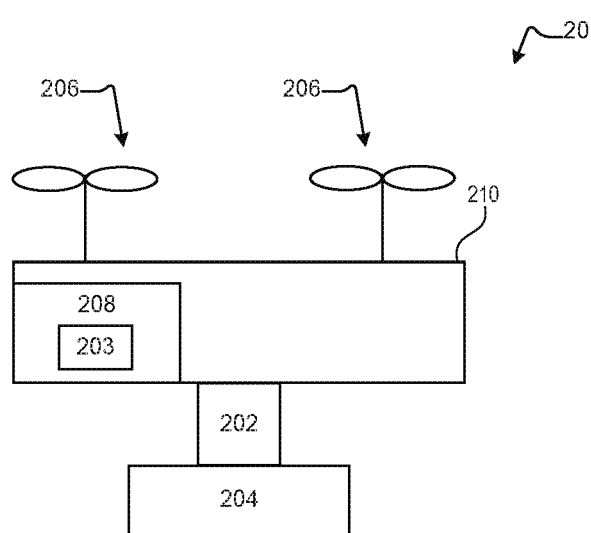
FIG. 2 is a partially schematic illustration of a UAV configured in accordance with representative embodiments of the present technology.

FIG. 2 is a partially schematic illustration of a UAV 20 configured in accordance with representative embodiments of the present technology. The UAV 20 can include an air frame 210 that can in turn include a central portion and one or more outer portions. In particular embodiments, the air frame 210 can include four outer portions (e.g., arms) that are spaced apart from each other as they extend away from the central portion. In other embodiments, the air frame 210 can include other numbers of outer portions. In any of these embodiments, individual outer portions can support components of a propulsion system that drives the UAV 20. For example, individual arms can support corresponding individual motors that drive corresponding propellers 206.

The air frame 210 can carry a payload 204, for example, an imaging device. In particular embodiments, the imaging device can include an image camera (e.g., a camera that is configured to capture video data, still data, or both). The image camera can be sensitive to wavelengths in any of a variety of suitable wavelength bands, including visual, ultraviolet, infrared or combinations thereof. In still further embodiments, the payload 204 can include other types of sensors, other types of cargo (e.g., packages or other deliverable), or both. In many of these embodiments, the payload 204 is supported relative to the air frame 210 with a gimbal 202 that allows the payload to be independently positioned relative to the air frame 210. Accordingly, for example when the payload 204 includes the imaging device, the imaging device can be moved relative to the air frame 210 to track a target. More particularly, for example, the imaging device can be rotated by an angle relative to the air frame 210 (or relative to another reference plane such as a horizontal plane). When the UAV 20 is not in flight, a landing gear can support the UAV 20 in a position that protects the payload 204.

In a representative embodiment, the UAV 20 includes a controller 208 carried by the UAV 20. The controller 208 can include an on-board computer-readable medium 203 that executes instructions directing the actions of the UAV 20, including, but not limited to, operation of the propulsion system and the imaging device. The on-board computer-readable medium 203 can be removable from the UAV 20.

Figure 3A:
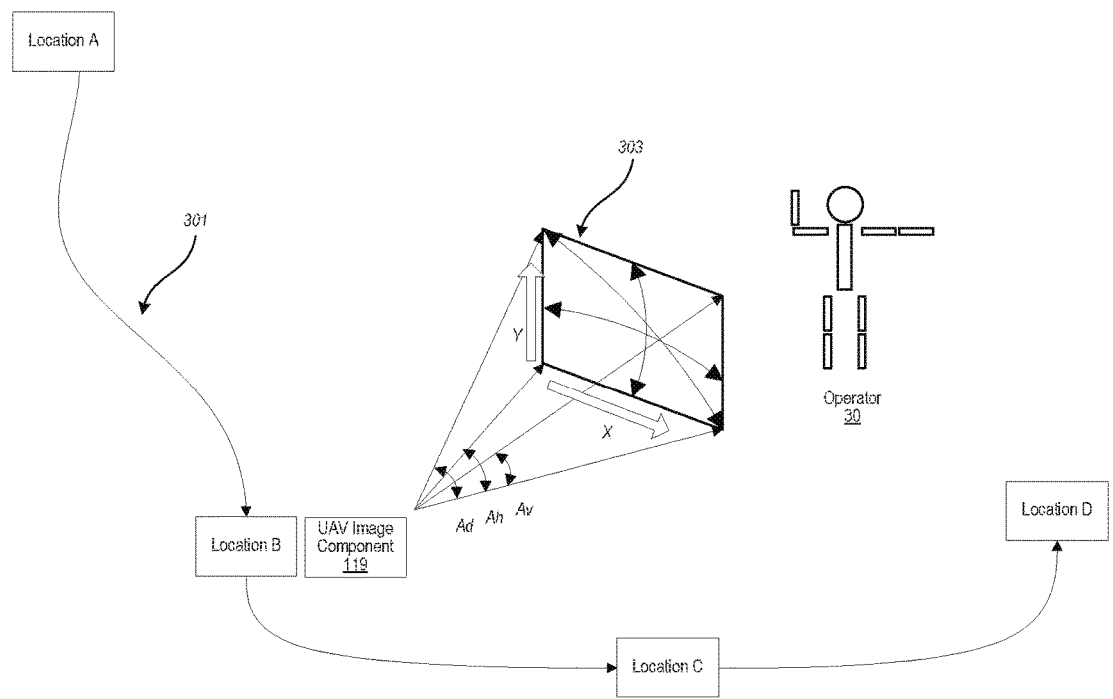
FIG. 3A is a partially schematic diagram illustrating a 3D path and an action item generated in accordance with representative embodiments of the present technology.

FIG. 3A is a partially schematic diagram illustrating a generated 3D path 301 and an action item in accordance with representative embodiments of the present technology. In the illustrated embodiments, the generated 3D path 301 passes locations A, B, C, and D. In the illustrated embodiments, the action item includes taking a picture 303 of an operator 30 by a UAV image component 119 at location A. The action item can further specify a particular format of the picture 303 to be taken. For example, the action item can require that the picture 303 is taken at a specific angle of view that can be measured based on a horizontal angle (e.g., angle $A_h$ in FIG. 3A), a vertical angle (e.g., angle $A_v$ in FIG. 3A), or a diagonal angle (angle $A_d$ in FIG. 3A). More particularly, the angle of view of the image camera 119 determines how the picture 303 looks, and where the operator 30 is located in the picture 303 (e.g., the operator 30 may be located at the center of the picture 303 and occupy a half or a quarter of the total image area of the picture 303).

Figure 3B:
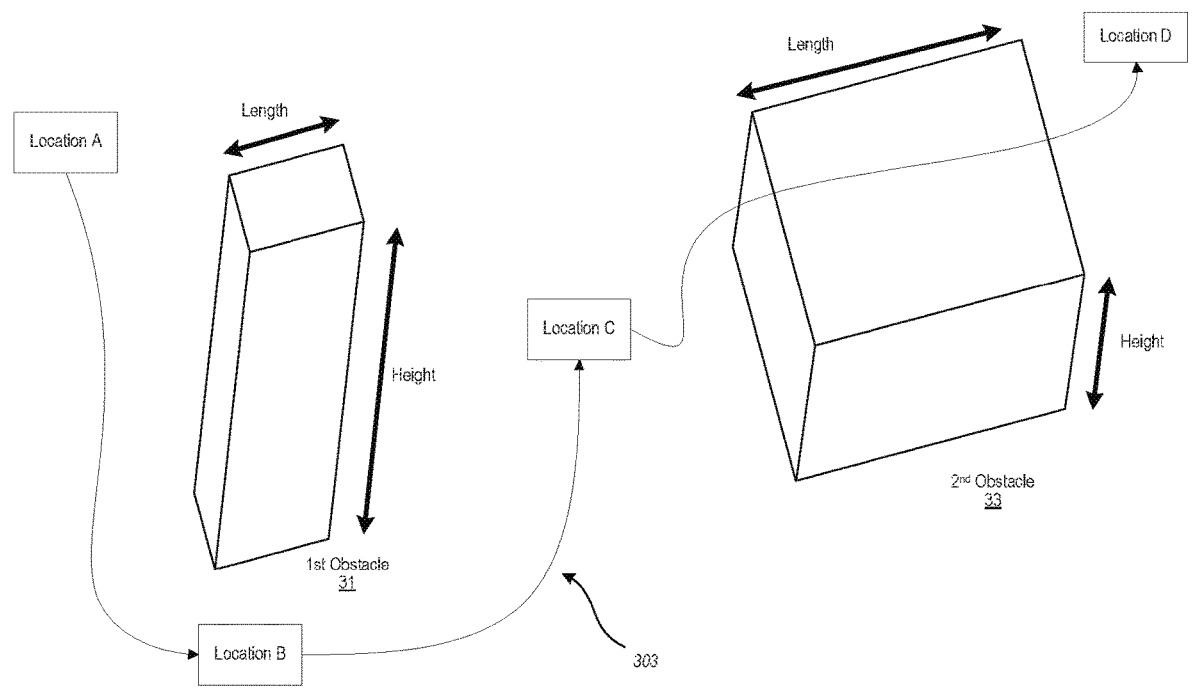
FIG. 3B is a partially schematic diagram illustrating a 3D path that avoids obstacles and is generated in accordance with representative embodiments of the present technology.

FIG. 3B is a partially schematic diagram illustrating a generated 3D path 303 that avoids first and second obstacles 31, 33 in accordance with representative embodiments of the present technology. The shape of the obstacle can be one of the factors to consider when generating the 3D path 303. In the illustrated embodiments, for example, the generated 3D path 303 is to pass through locations A, B, C, and D. Flying along the 3D path 303, the UAV can avoid the first obstacle 31 and the second obstacle 33. The first obstacle 31 is a "slim-type" obstacle which has a low length-verses-height ratio. In the illustrated embodiment, the UAV flying along the 3D path 303 avoids the first obstacle 31 by flying around it. As shown, the second obstacle 33 is a "wide-type" obstacle which has a high length-verses-height ratio. The UAV flying along the 3D path 303 avoids the second obstacle 33 by flying over it. In some embodiments, an operator can set his/her own rules (e.g., to keep a 10-meter distance between the UAV and a "slim-type" obstacle; or fly 15 meters above a "wide-type" obstacle) when generating the 3D path 303.

Figure 4A:
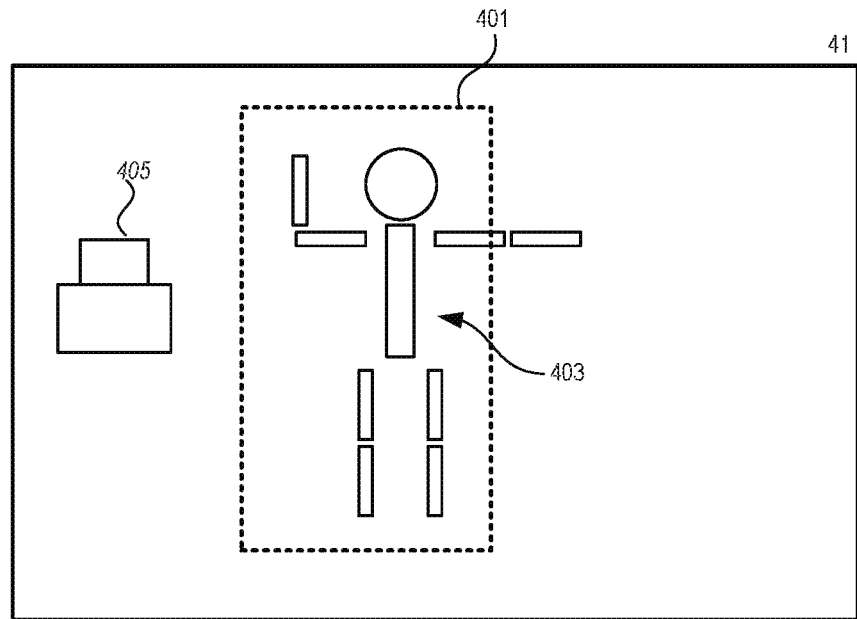
FIGS. 4A and 4B are partially schematic diagrams illustrating images created by an image component of a UAV in accordance with representative embodiments of the present technology.
Figure 4B:
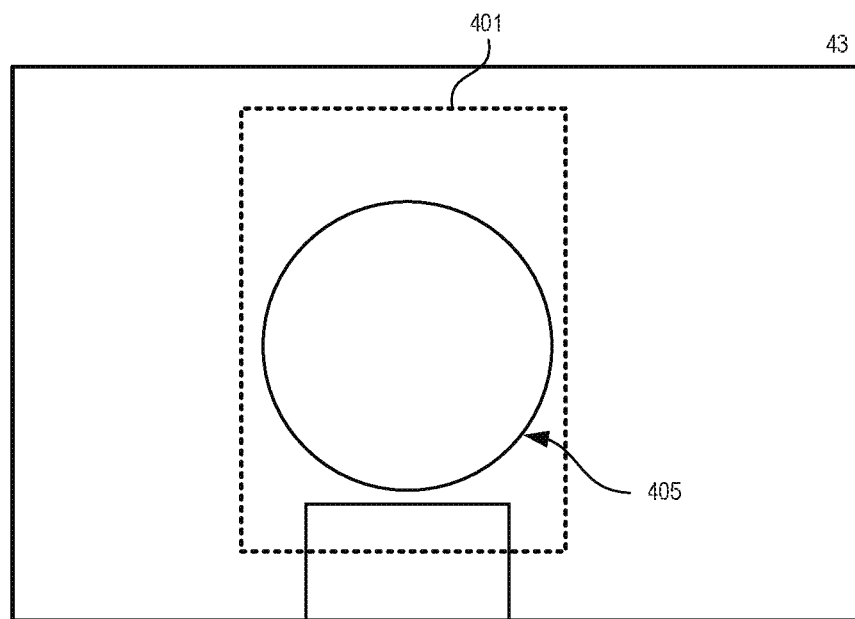

FIGS. 4A and 4B are partially schematic diagrams illustrating images 41 and 43 created by an image component of a UAV in accordance with representative embodiments of the present technology. The image 41 shown in FIG. 4A represents a collected image before an adjustment by the system based on an action item. The image 43 shown in FIG. 4B represents an adjusted image after an adjustment based on the action item. In FIG. 4A, the image 41 can include a specific area 401, a target person 403, and a background item 405. In the illustrated embodiments, an action item associated with the image 400 can be "positioning the face of the target person 403 in the center of the specific area 401" and "making the face of the target person 403 occupy more than 50% of the specific area 401." Based on the action item, the system can adjust the image 41 to become the image 43 (e.g., by changing planned 3D flight paths) so as to satisfy the requirements specified in the action item. Using similar techniques, the system can enable an operator to precisely control a UAV or a component of the UAV to perform other particular tasks by setting parameters for corresponding action items.

Figure 5:
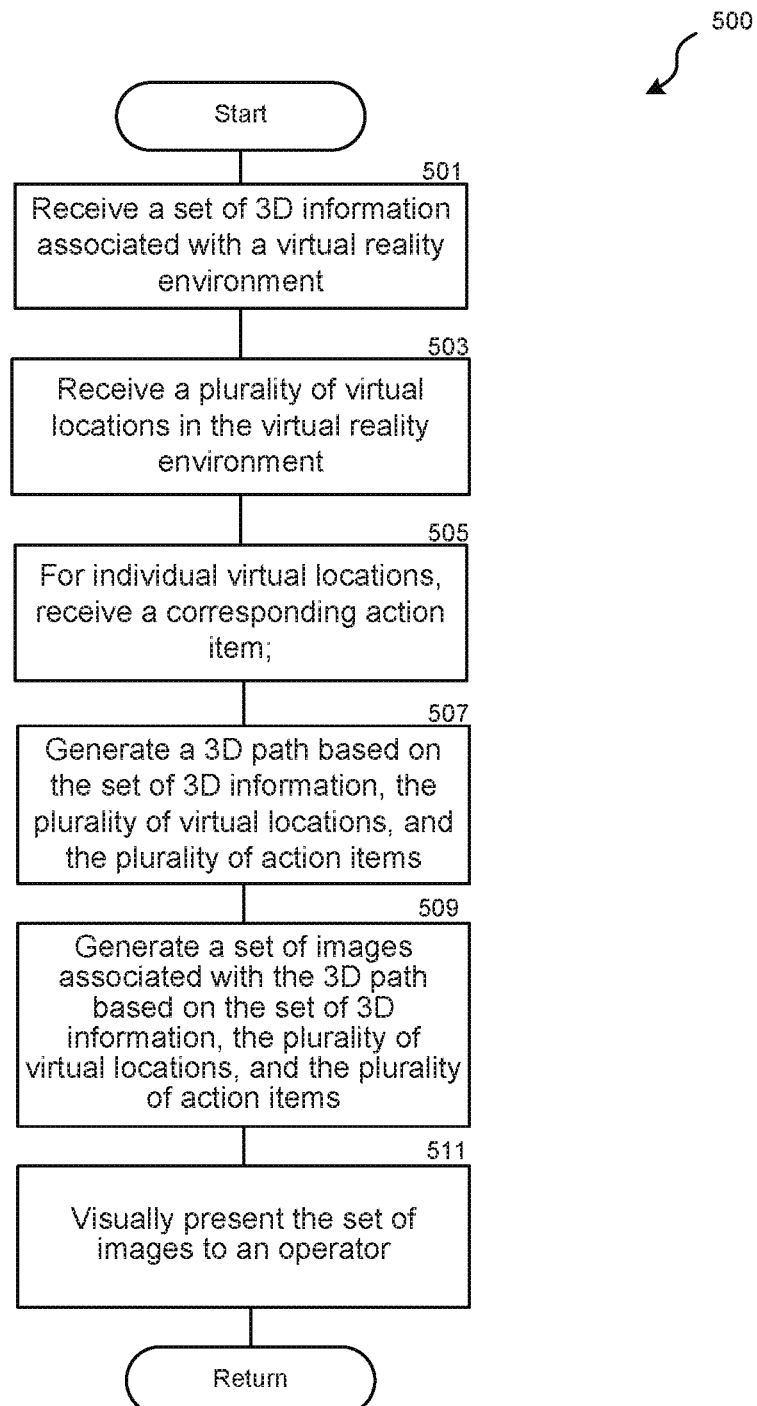
FIG. 5 is a flowchart illustrating embodiments of a method for generating a 3D flight path in accordance with representative embodiments of the present technology.

FIG. 5 is a flowchart illustrating embodiments of a method 500 for generating a 3D flight path in accordance with representative embodiments of the present technology. The method 500 can be initiated by a request from an operator. At block 501, the method receives a set of 3D information associated with a virtual reality environment. For example, the 3D information can be created by software such as 3dsMax® available from Autodesk Inc. Of UK, or other suitable 3D-model-building applications. Block 503 includes receiving a plurality of virtual locations in the virtual reality environment. In some embodiments, the method 500 can include receiving physical locations (in the real-world environment) and transforming the same to virtual locations in the virtual reality environment. The physical or virtual locations can be provided in a format of 3D coordinates (e.g., tables of points). At block 505, for individual virtual locations, the system receives at least one corresponding action item. In particular embodiments, the action item can include (1) aligning an image component of a UAV with a target; (2) positioning an image component of a UAV at a horizontal level; (3) maintaining a view angle of an image component of a UAV; (4) aiming an image component of a UAV toward a target; (5) collecting an image associated with a target via an image component of a UAV; (6) instructing a UAV to fly around a target; and/or (7) instructing a UAV to rotate about an axis.

At block 507, the system generates a 3D path based on the set of 3D information, the plurality of virtual locations, and the plurality of action items. The method 500 then continues at block 509 to generate a set of images associated with the 3D path based on the set of 3D information, the plurality of virtual locations, and the plurality of action items. In some embodiments, the set of images can be generated by a virtual reality system. At block 511, the system visually presents the set of images to an operator. In particular embodiments, the set of images is visually presented to the operator via a virtual reality device. The method 500 then returns to await for further instructions. In some embodiments, the system can further adjust the 3D path upon receiving an instruction from the operator via a virtual reality device.

From the foregoing, it will be appreciated that specific embodiments of the technology have been described herein for purposes of illustration, but that various modifications may be made without deviating from the technology. For example, particular embodiments were described above in the context of a UAV. In other embodiments, the present technology can be implemented by other suitable moveable devices, such as an unmanned ground vehicle (UV), an unmanned surface vehicle (US), or a robot.

Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

We claim:

1. A method for generating a three-dimensional (3D) path for a moveable platform, the method comprising:
   receiving a set of 3D information associated with a virtual reality environment;
   receiving a plurality of virtual locations in the virtual reality environment;
   for individual virtual locations, receiving a corresponding action item;
   generating a 3D path in the virtual reality environment based on at least one of the set of 3D information, the plurality of virtual locations, and the plurality of action items;
   generating a set of virtual reality images that the moveable platform can collect at each one of the virtual locations along the 3D path in the virtual reality environment based on the set of 3D information, the plurality of virtual locations, and the plurality of action items; and
   visually presenting the set of images to an operator.

2. The method of claim 1, wherein the movable platform includes an unmanned aerial vehicle (UAV), an unmanned ground vehicle (UV), an unmanned surface vehicle (US), or a robot.

3. The method of claim 1, further comprising generating the set of images by a flight simulating process.

4. The method of claim 1, wherein the set of images is visually presented via a virtual reality device, and wherein the set of images is visually presented to the operator based on an order determined by the 3D path.

5. The method of claim 1, further comprising adjusting the 3D path in response to receiving an instruction from the operator via a virtual reality device.

6. The method of claim 1, wherein the moveable platform includes an image component, and wherein the action item includes at least one of (a) aligning the image component with a target, (b) establishing or maintaining a view angle of the image component, (c) aiming the image component toward a target, (d) collecting an image associated with the target via the image component, or (e) aiming the image component toward the target and instructing the movable platform to move around the target.

7. The method of claim 1, wherein the plurality of virtual locations correspond to a plurality of physical locations.

8. The method of claim 1, further comprising receiving an additional action item corresponding to one of the plurality of virtual locations.

9. The method of claim 8, wherein the additional action item is received by a manual input.

10. The method of claim 1, further comprising manually adjusting the plurality of action items.

11. The method of claim 1, further comprising generating the 3D path at least partially based on an obstacle avoidance algorithm and a shape of an obstacle in the environment.

12. The method of claim 1, further comprising generating the 3D path at least partially based on a shortest distance algorithm and an expected moving time of the moveable platform.

13. The method of claim 1, further comprising generating the 3D path at least partially based on an input from the operator.

14. The method of claim 13, wherein the input is received from the operator via the virtual reality device.

15. The method of claim 13, wherein the input is associated with a gesture of the operator.

16. The method of claim 1, further comprising determining the plurality of virtual locations at least partially based on an input from the operator.

17. The method of claim 5, wherein the instruction is received as a gesture by the operator.

18. The method of claim 5, further comprising adjusting the 3D path in response to receiving the instruction from the operator by at least one of:
   (a) identifying an additional virtual location in a virtual environment corresponding to the environment and adjusting the 3D path to include the additional virtual location;
   (b) identifying an existing virtual location from the plurality of virtual locations and adjusting the 3D path to exclude the identified existing virtual location; or
   (c) adjusting a curvature of the 3D path visually presented in the virtual environment corresponding to the environment.

* * * * *